(12) United States Patent
Kameoka et al.

(10) Patent No.: US 11,935,553 B2
(45) Date of Patent: Mar. 19, 2024

(54) SOUND SIGNAL MODEL LEARNING DEVICE, SOUND SIGNAL ANALYSIS DEVICE, METHOD AND PROGRAM

(71) Applicant: NIPPON TELEGRAPH AND TELEPHONE CORPORATION, Tokyo (JP)

(72) Inventors: Hirokazu Kameoka, Tokyo (JP); Li Li, Ibaraki (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 851 days.

(21) Appl. No.: 16/971,654

(22) PCT Filed: Feb. 22, 2019

(86) PCT No.: PCT/JP2019/006762
§ 371 (c)(1),
(2) Date: Aug. 20, 2020

(87) PCT Pub. No.: WO2019/163940
PCT Pub. Date: Aug. 29, 2019

(65) Prior Publication Data
US 2020/0395036 A1 Dec. 17, 2020

(30) Foreign Application Priority Data
Feb. 23, 2018 (JP) ................ 2018-031294

(51) Int. Cl.
*G10L 21/0308* (2013.01)
*G06F 18/23* (2023.01)
*G06N 3/08* (2023.01)
*G10L 21/0272* (2013.01)
*G10L 25/30* (2013.01)

(52) U.S. Cl.
CPC .......... *G10L 21/0308* (2013.01); *G06F 18/23* (2023.01); *G06N 3/08* (2013.01); *G10L 21/0272* (2013.01); *G10L 25/30* (2013.01)

(58) Field of Classification Search
CPC . G10L 21/0308; G10L 21/0272; G10L 25/30; G10L 25/18
See application file for complete search history.

(56) References Cited

U.S. PATENT DOCUMENTS

2016/0283841 A1* 9/2016 Sainath ................. G06N 3/045
2019/0180142 A1* 6/2019 Lim .................... G10L 21/0272
(Continued)

OTHER PUBLICATIONS

Lee, Jongpil, et al. "Sample-level deep convolutional neural networks for music auto-tagging using raw waveforms." arXiv preprint arXiv:1703.01789 (2017). (Year: 2017).*
(Continued)

*Primary Examiner* — Douglas Godbold (57) ABSTRACT

It is possible to stably learn, in a short time, a model that can output embedded vectors for calculating a set of time frequency points at which the same sound source is dominant. Parameters of the neural network are learned based on a spectrogram of a sound source signal formed by a plurality of sound sources such that embedded vectors for time frequency points at which the same sound source is dominant are similar to embedded vectors for each of time frequency points output by a neural network, which is a CNN.

20 Claims, 4 Drawing Sheets

(56) References Cited

U.S. PATENT DOCUMENTS

2019/0259378 A1* 8/2019 Khadloya .............. G06N 20/10
2021/0233511 A1* 7/2021 Li ........................... G06N 3/04

OTHER PUBLICATIONS

Cyrta, Pawel, Tomasz Trzciński, and Wojciech Stokowiec. "Speaker diarization using deep recurrent convolutional neural networks for speaker embeddings." Information Systems Architecture and Technology: Proceedings of 38th International Conference on Information Systems Architecture and Technology—ISAT (Year: 2017).*

Hershey, John R., et al., "Deep Clustering: Discriminative Embeddings for Segmentation and Separation," ICASSP 2016, 978-1-4799-9988-0/16 IEEE.

Ikutame, Takahiro, "High-pitch Recognition of Multiple Sound Signals by Two-Dimensional Convolution Network with Full-Layer Gates," IPSJ SIG Technical Report, Vo 1.2018-MUS-118 No. 12; SLP-120 No. 12 Feb. 20, 2018.

Kato, Naoki, "Moving Image Person Reidentification Using Distance Learning by Convolutional Neural Network," Journal of the Japan Society for Precision Engineering vol. 83. Na Dec. 2017 117.

* cited by examiner

SOUND SIGNAL MODEL LEARNING DEVICE, SOUND SIGNAL ANALYSIS DEVICE, METHOD AND PROGRAM

CROSS-REFERENCE TO RELATED APPLICATIONS

This application is a U.S. 371 Application of International Patent Application No. PCT/JP2019/006762, filed on 22 Feb. 2019, which application claims priority to and the benefit of JP Application No. 2018-031294, filed on 23 Feb. 2018, the disclosures of which are hereby incorporated herein by reference in their entireties.

TECHNICAL FIELD

The present invention relates to an acoustic signal model learning device, an acoustic signal analysis device, a method, and a program and, more particularly, to an acoustic signal model learning device, an acoustic signal analysis device, a method, and a program for analyzing an acoustic signal.

BACKGROUND ART

A problem for identifying a sound source (most) dominant at time frequency points in a time frequency representation (hereinafter, spectrogram) of an acoustic signal is called acoustic scene analysis problem. If the sound source dominant at the time frequency points can be identified, it is possible to perform sound source separation with a time frequency mask for allowing only components at time frequency points at which the same sound source is dominant to pass.

In recent years, a large number of methods of applying a neural network (NN) to the acoustic scene analysis problem have been proposed. For example, an NN that receives spectrograms as an input and outputs sound source labels (or posterior distributions thereof) at time frequency points is considered and parameters of the NN are learned using, as training data, the spectrograms with the sound source labels attached to the time frequency points. Consequently, it is possible to predict sound source labels with, as a clue, textures around the time frequency points with respect to spectrograms of test data. In this approach, when the training data is prepared, inconsistency of the sound source labels among the spectrograms is directly related to performance deterioration. For example, it is assumed that a spectrogram A and a spectrogram B of a mixed signal formed by a sound source A and a sound source B are set as learning data, a label 1 is given to the sound source A and a label 2 is given to the sound source B in the spectrogram A and, conversely, the label 2 is given to the sound source A and the label 1 is given to the sound source B in the spectrogram B. Then, an identifier learned by such learning data cannot have an ability to identify the sound source A and the sound source B at points of the spectrograms of the test data. Accordingly, when the training data is prepared, it is necessary to carefully give a consistent label among the spectrograms (always give the same label to the same sound source). This can be a difficulty depending on a scene of use. For example, when a sound source separation task targeting voice is assumed, a process for manually allocating speaker labels to each one of utterance data requires a lot of labor as an amount of training data increases. To cope with this problem, there has been proposed a method called deep clustering for making it possible to, instead of using the sound source labels given to the time frequency points, estimate time frequency masks for each of sound sources based on only a label indicating whether dominant sound sources are the same (indicating 1 if the sound sources are the same and indicating 0 if the sound sources are different) for each of pairs of time frequency points of spectrograms (NPL 1). Labor for giving such labels is small compared with labor for giving sound source labels consistent among all data. Therefore, an advantage in practical use is large. In this method, embedded vectors are considered for each of time frequency points and mapping from time frequency point characteristics to the embedded vectors is learned such that embedded vectors of time frequency points at which the same sound source is dominant are close to one another. Consequently, by performing clustering on the embedded vectors during a test, it is possible to obtain a set of the time frequency points at which the same sound source is dominant. Consequently, it is possible to configure time frequency masks of sound sources for performing sound source separation.

CITATION LIST

Non Patent Literature

[NPL 1] J. R. Hershey, Z. Chen, J. Le Roux, S. Watanabe, "Deep clustering: Discriminative embeddings for segmentation and separation," in Proc. ICASSP, pp. 31-35, 2016.

SUMMARY OF THE INVENTION

Technical Problem

In the conventional deep clustering method, a bidirectional long short-term memory (BLSTM) network, which is a kind of a recurrent NN (recurrent neural network; RNN), is used as a mapping function to the embedded vectors. However, it is known that, when an RNN-based network is multi-layered, problems occurs, for example, learning is unstable, learning takes time, and overlearning tends to occur.

The present invention has been devised in order to solve the problems described above, and an object of the present invention is to provide an acoustic signal model learning device, a method, and a program that can stably learn, in a short time, a model that can output embedded vectors for calculating a set of time frequency points at which the same sound source is dominant.

Another object of the present invention is to provide an acoustic signal model learning device, a method, and a program that can accurately calculate a set of time frequency points at which the same sound source is dominant.

Means for Solving the Problem

In order to achieve the objects, an acoustic signal model learning device according to a first invention is an acoustic signal model learning device that learns a neural network that receives a spectrogram of a sound source signal as an input and outputs embedded vectors for each of time frequency points, the acoustic signal model learning device including a learning unit that learns, based on a spectrogram of a sound source signal formed by a plurality of sound sources, in which a set of time frequency points at which a same sound source is dominant is known, parameters of the neural network such that embedded vectors for the time frequency points at which the same sound source is dominant are similar to the embedded vectors for each of the time frequency points output by the neural network, which is a CNN (Convolutional Neural Network).

An acoustic signal analysis device according to a second invention includes: an input unit that receives, as an input, a spectrogram of a sound source signal in which constituent sounds are mixed; and a clustering unit that inputs the spectrogram of the sound source signal received by the input unit to a neural network, which is a CNN (Convolutional Neural Network) and receives, as an input, a spectrogram of a sound source signal learned in advance and outputs embedded vectors for each of time frequency points, calculates the embedded vectors for each of the time frequency points, and clusters the embedded vectors for each of the time frequency points to thereby calculate the set of the time frequency points at which the same sound source is dominant. The neural network is learned in advance based on a spectrogram of a sound source signal formed by a plurality of sound sources, in which the set of the time frequency points at which the same sound source is dominant is known, such that embedded vectors for the time frequency points at which the same sound source is dominant are similar to the embedded vectors for each of the time frequency points output by the neural network.

An acoustic signal model learning method according to a third invention is an acoustic signal model learning method in an acoustic signal model learning device that learns a neural network that receives a spectrogram of a sound source signal as an input and outputs embedded vectors for each of time frequency points, the acoustic signal model learning method including and executing a step in which a learning unit learns, based on a spectrogram of a sound source signal formed by a plurality of sound sources, in which a set of time frequency points at which a same sound source is dominant is known, parameters of the neural network such that embedded vectors for the time frequency points at which the same sound source is dominant are similar to the embedded vectors for each of the time frequency points output by the neural network, which is a CNN (Convolutional Neural Network).

An acoustic signal analysis method according to a fourth invention includes and executes: a step in which an input unit receives, as an input, a spectrogram of a sound source signal in which constituent sounds are mixed; and a step in which a clustering unit inputs the spectrogram of the sound source signal received by the input unit to a neural network, which is a CNN (Convolutional Neural Network) and receives, as an input, a spectrogram of a sound source signal learned in advance and outputs embedded vectors for each of time frequency points, calculates the embedded vectors for each of the time frequency points, and clusters the embedded vectors for each of the time frequency points to thereby calculate a set of the time frequency points at which a same sound source is dominant. The neural network is learned in advance based on a spectrogram of a sound source signal formed by a plurality of sound sources, in which the set of time frequency points at which the same sound source is dominant is known, such that embedded vectors for the time frequency points at which the same sound source is dominant are similar to the embedded vectors for each of the time frequency points output by the neural network.

A program according to a fifth invention is a program for causing a computer to function as the units of the acoustic signal model learning device according to the first invention.

A program according to a sixth invention is a program for causing a computer to function as the units of the acoustic signal analysis device according to the second invention.

Effects of the Invention

With the acoustic signal model learning device, the method, and the program of the present invention, parameters of the neural network are learned based on a spectrogram of a sound source signal formed by a plurality of sound sources, in which a set of time frequency points at which the same sound source is dominant is known, such that embedded vectors for the time frequency points at which the same sound source is dominant are similar to embedded vectors for each of the time frequency points output by the neural network, which is a CNN (Convolutional Neural Network). Consequently, there is an effect that it is possible to stably learn, in a short time, a model that can output embedded vectors for calculating a set of time frequency points at which the same sound source is dominant.

With the acoustic signal model learning device, the method, and the program of the present invention, a spectrogram of a sound source signal received by an input unit 210 is input to a neural network, which is a CNN and receives, as an input, a spectrogram of a sound source signal learned in advance and outputs embedded vectors for each of time frequency points, the embedded vectors for each of the time frequency points are calculated, and the embedded vectors for each of the time frequency points are clustered, whereby the set of the time frequency points at which the same sound source is dominant is calculated. Consequently, it is possible to accurately calculate the set of the time frequency points at which the same sound source is dominant.

DESCRIPTION OF EMBODIMENTS

An embodiment of the present invention is explained in detail below with reference to the drawings.

In the embodiment of the present invention, in order to solve the difficulty of the RNN, a deep clustering method using a convolutional neural network (CNN) as a mapping function to embedded vectors is proposed. Specifically, the CNN as the mapping function to the embedded vectors is configured using a network architecture obtained by combining a one-dimensional CNN or a two-dimensional CNN, a Dilated CNN, a gated CNN (Gated Linear Unit; GLU), a Strided CNN, a skip architecture, and the like.

<Existing Method>

First, a deep clustering method, which is an existing method, serving as a premise of the embodiment of the present invention is explained.

A vectorized form of a spectrogram of a mixed signal formed by C sound sources is represented as follows:

$$x=[x_1, \ldots, x_n, \ldots, x_N]^T \in \mathbb{R}^N$$

where, n represents an index corresponding to a time frequency point (f,t) and N represents a total F×T of time frequency points. In the deep clustering method, first, a goal is to consider a D-dimensional embedded vector, a norm of which is 1, $$V_n = [v_{n,1}, \ldots, v_{n,D}]$$

for each of points n of the spectrogram and learn a mapping function $$V = g_\Theta(x)$$

such that embedded vectors at time frequency points at which the same sound source is dominant are close to one another. Provided that $$V = [v_1; \ldots; v_N] \in \mathbb{R}^{N \times D}.$$

In the conventional deep clustering method, $$g_\Theta$$

is modeled by a BLSTM and $$\Theta$$

represents a parameter thereof. A one-hot vector (row vector) indicating a sound source label dominant at the time frequency points n of x is represented as $$y_n \in \{0,1\}^{1 \times C}$$

and $$Y = [y_1; \ldots; y_N] \in \{0,1\}^{N \times C},$$

in the deep clustering method, $$\Theta$$

is learned to minimize the following Expression (1).

[Formula 1]

$$\mathcal{J}(V) = \|VV^T - YY^T\|_F^2 \qquad (1)$$
$$= \|V^T V\|_F^2 - 2\|V^T Y\|_F^2 + \|Y^T Y\|_F^2$$

Provided that $$\|\cdot\|_F$$

represents a Frobenius norm.

$$YY^T$$

is a N× binary matrix, in which an element in an n-th row and an n'-th column is 1 when the same sound source is dominant at time frequency points n and n' and is 0 when the same sound source is not dominant, and is called similarity matrix. A row of Y corresponds to a number of a time frequency point and a column of Y corresponds to a number of a sound source. For example, if a sound source c is dominant at the time frequency point n, an element in an n-th row of Y is 1 only in a c-th column and is 0 in the rest of columns.

A motive of this system is that, even when it is not easy to prepare Y as training data as explained above, $$YY^T$$

can be relatively easily prepared.

After completion of the learning of the parameter $$\Theta,$$

V is calculated for a spectrogram x of an input signal and clustering (k-average clustering or the like) is performed using row vectors of V as data vectors. Consequently, it is possible to obtain a set of time frequency points at which the same sound source is dominant.

<Proposed Method>

As explained above, in the conventional deep clustering method, the BLSTM network, which is a kind of the RNN, is used as the mapping function $$g_\Theta$$

to embedded vectors. However, it is known that, when the RNN-based network is multi-layered, problems occur, for example, learning is unstable, learning takes time, and overlearning tends to occur.

Therefore, in the embodiment of the present invention, $$g_\Theta$$

is modeled using the CNN. Specifically, a mapping function to embedded vectors is configured using a network architecture obtained by combining a one-dimensional CNN or a two-dimensional CNN, a Dilated CNN, a GLU, a Strided CNN, a skip architecture, and the like.

The one-dimensional CNN is equivalent to a case in which an input x is regarded as an image, a size of an F channel of which is 1×T, and an output V is regarded as an image, a size of an F×D channel of which is 1×T. The two-dimensional CNN is equivalent to a case in which the input x is regarded as an image, a size of one channel of which is F×T, and the output V is regarded as an image, a size of a D channel of which is F×T. It is reported that the GLU is a kind of a CNN originally introduced first as a prediction model for a word row and exerts word prediction performance exceeding an LSTM in an experiment under the same conditions. When an output of an l-th layer, which is a convolutional layer, is represented as hi, in the GLU, hi is given by the following Expression (2).

$$h_l = (W_l * h_{l-1} + b_l) \odot \sigma(V_l * h_{l-1} + c_l) \qquad \text{[Formula 2]}$$

Provided that σ represents a sigmoid function for each elements and $$W_l \in \mathbb{R}^{D_l \times D_{l-1} \times \tilde{N}_l \times \tilde{M}_l},$$

$$b_l \in \mathbb{R}^{D_l \times N_l \times M_l},$$

$$V_l \in \mathbb{R}^{D_l \times D_{l-1} \times \tilde{N}_l \times \tilde{M}_l},$$

$$c_l \in \mathbb{R}^{D_l \times N_l \times M_l}$$

are parameters that should be estimated.

The above is represented for each of elements as the following Expression (3).

[Formula 3]

$$h_{l,d,n,m} = \left( \sum_{d'=0}^{D_{l-1}-1} \sum_{n'=0}^{\tilde{N}_l-1} \sum_{m'=0}^{\tilde{M}_l-1} u'_{l,d,d',n-n',m-m'} h_{l-1,d',n',m'} + b_{l,d,n,m} \right) \cdot \qquad (3)$$

$$\sigma \left( \sum_{d'=0}^{D_{l-1}-1} \sum_{n'=0}^{\tilde{N}_l-1} \sum_{m'=0}^{\tilde{M}_l-1} v_{l,d,d',n-n',m-m'} h_{l-1,d',n',m'} + c_{l,d,n,m} \right)$$

An activation function in a form of the above Expression (2) is called GLU. The Strided CNN is a CNN that allows to set an application interval of convolution of a filter to other than 1. When a stride width is 2, a size of an output of convolution is ½. The Dilated CNN is a CNN in which a coefficient of an appropriate filter is fixed to 0 to increase a range of a receptive field without increasing parameters. The skip architecture indicates an architecture of an NN that inputs an input or an output of an 1-th layer to an 1+1-th layer and to an 1+1'-th layer (1'>1).

<Configuration of the Acoustic Signal Model Learning Device According to the Embodiment of the Present Invention>

Figure 1:
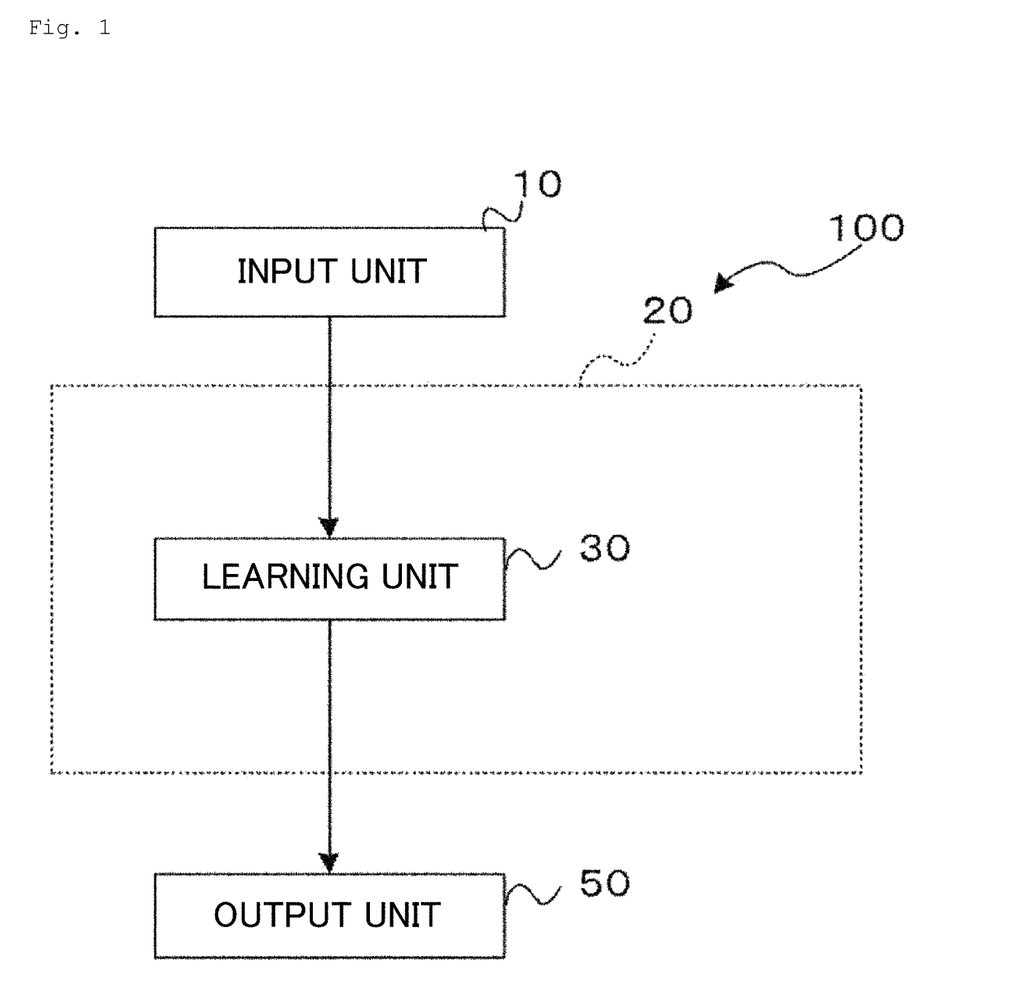
FIG. 1 is a block diagram illustrating the configuration of an acoustic signal model learning device according to an embodiment of the present invention.

The configuration of the acoustic signal model learning device according to the embodiment of the present invention is explained. The acoustic signal model learning device learns a neural network that receives a spectrogram of a sound source signal as an input and outputs convolutional vectors for each of time frequency points. As illustrated in FIG. 1, an acoustic signal model learning device 100 according to the embodiment of the present invention can be configured by a computer including a CPU, a RAM, and a ROM having stored therein a program and various data for executing an acoustic signal model learning processing routine explained below. The acoustic signal model learning device 100 includes, in terms of functions, as illustrated in FIG. 1, an input unit 10, a computing unit 20, and an output unit 50.

The input unit 10 receives a spectrogram of a sound source signal formed by a plurality of sound sources in which a set of time frequency points at which the same sound source is dominant is known. It is assumed that a label for identifying the dominant sound source is given to the time frequency points.

The computing unit 20 includes a learning unit 30.

The learning unit 30 learns, based on a spectrogram of a sound source signal formed by a plurality of sound sources, parameters of the neural network such that embedded vectors for time frequency points at which the same sound source is dominant are similar to embedded vectors for each of time frequency points output by a neural network, which is a CNN, and outputs the parameters to the output unit 50.

In this embodiment, convolutional layers of the neural network are configured such that all the convolutional layers are two-dimensional, Dilated, and GLUs. The GLUs use the output hi of the convolutional layer represented by the above Expression (2). Parameters $$W_l \in \mathbb{R}^{D_l \times D_{l-1} \times \tilde{N}_l \times \tilde{M}_l},$$

$$b_l \in \mathbb{R}^{D_l \times N_l \times M_l},$$

$$V_l \in \mathbb{R}^{D_l \times D_{l-1} \times \tilde{N}_l \times \tilde{M}_l},$$

$$c_l \in \mathbb{R}^{D_l \times N_l \times M_l}$$

are learned to minimize the above Expression (1). Note that $$YY^T$$

of the above Expression (1) is decided from the set of the time frequency points at which the same sound source is dominant for the input spectrogram. The configuration of being Dilated and GLUs indicates that elements of a part of w and v in respective parentheses in the above Expression (3) are fixed to 0. Besides the configuration described above, the neural network may be one-dimensional instead of two-dimensional. The Strided and the skip architecture may be adopted.

<Action of the Acoustic Signal Model Learning Device According to the Embodiment of the Present Invention>

Action of the acoustic signal model learning device 100 according to the embodiment of the present invention is explained. The acoustic signal model learning device 100 executes an acoustic signal model learning processing routine illustrated in FIG. 2.

Figure 2:
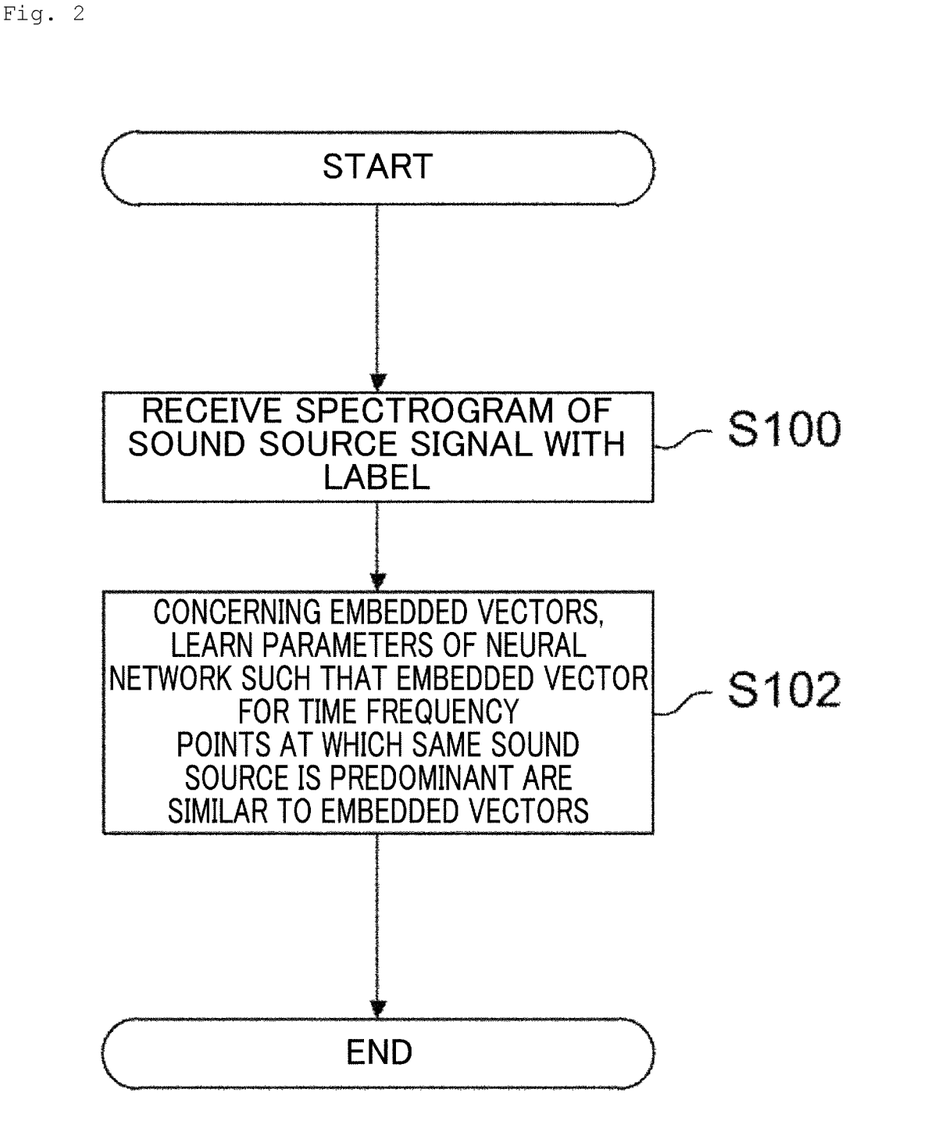
FIG. 2 is a flowchart illustrating an acoustic signal model learning processing routine in the acoustic signal model learning device according to the embodiment of the present invention.

First, in step S100, the acoustic signal model learning device 100 receives a spectrogram of a sound source signal formed by a plurality of sound sources in which a set of time frequency points at which the same sound source is dominant is known. It is assumed that a label for identifying the dominance sound source is given to the time frequency points.

Subsequently, in step S102, the acoustic signal model learning device 100 learns, based on the spectrogram of the sound source signal formed by the plurality of sound sources, parameters of the neural network such that embedded vectors for time frequency points at which the same sound source is dominant are similar to embedded vectors for each of the time frequency points output by the neural network, which is a CNN, and outputs the parameters to the output unit 50. Convolutional layers of the neural network have a configuration in which all the convolutional layers are two-dimensional, Dilated, and GLUs.

As explained above, with the acoustic signal model learning device according to the embodiment of the present invention, parameters of the neural network are learned based on a spectrogram of a sound source signal formed by a plurality of sound sources, in which a set of time frequency points at which the same sound source is dominant is known, such that embedded vectors for time frequency points at which the same sound source is dominant are similar to embedded vectors for each of the time frequency points output by the neural network, which is a CNN. Consequently, it is possible to stably learn, in a short time, a model that can output embedded vectors for calculating a set of time frequency points at which the same sound source is dominant.

<Configuration of the Acoustic Signal Analysis Device According to the Embodiment of the Present Invention>

Figure 3:
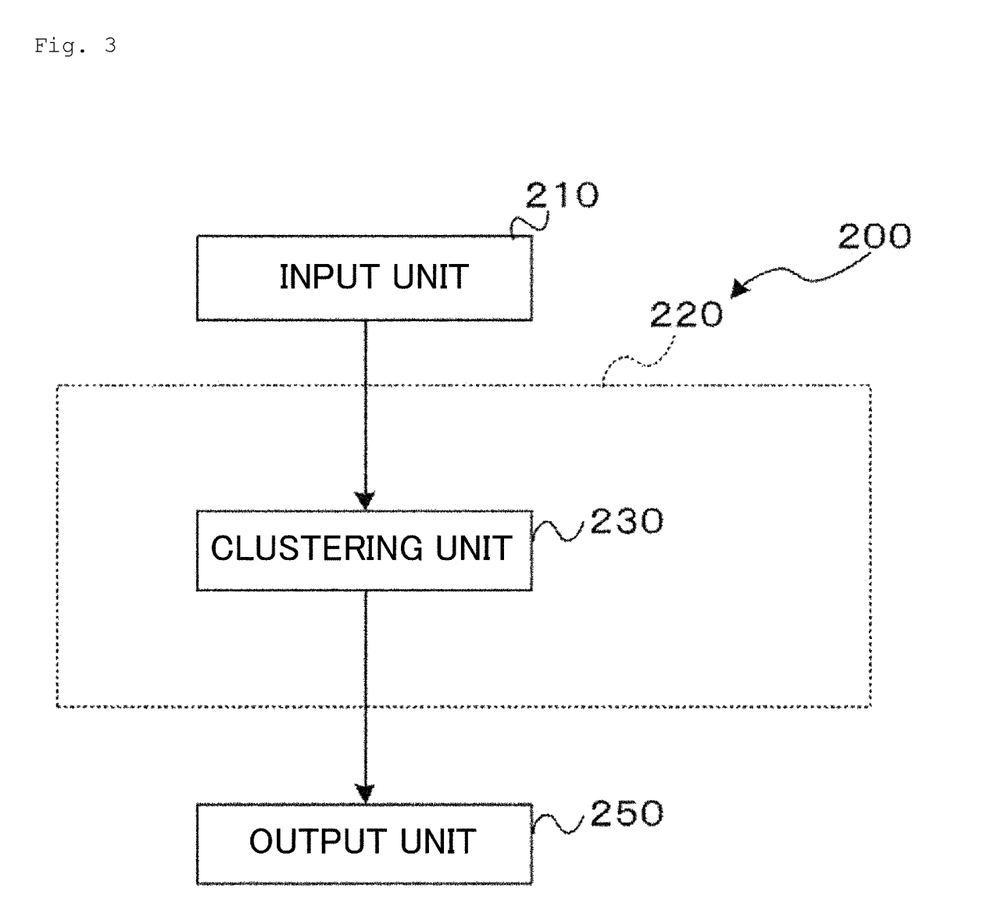
FIG. 3 is a block diagram illustrating the configuration of an acoustic signal analysis device according to the embodiment of the present invention.

The configuration of the acoustic signal analysis device according to the embodiment of the present invention is explained. As illustrated in FIG. 3, an acoustic signal analysis device 200 according to the embodiment of the present invention can be configured by a computer including a CPU, a RAM, and a ROM having stored therein a program and various data for executing an acoustic signal analysis processing routine explained below. The acoustic signal analysis device 200 includes, in terms of functions, as illustrated in FIG. 3, an input unit 210, a computing unit 220, and an output unit 250.

The input unit 210 receives, as an input, a spectrogram of a sound source signal in which constituent sounds are mixed.

The computing unit 220 includes a clustering unit 230.

The clustering unit 230 inputs the spectrogram of the sound source signal received by the input unit 210 to a neural network, which is a CNN and receives, as an input, a spectrogram of a sound source signal learned in advance by the acoustic signal model learning device 100 and outputs embedded vectors for each of time frequency points, and calculates the embedded vectors for each of the time frequency points. The clustering unit 230 clusters the embedded vectors for each of the time frequency points to thereby calculate a set of time frequency points at which the same sound source is dominant and outputs the set of the time frequency points to the output unit 250.

Convolutional layers of the neural network have a configuration in which all the convolutional layers are two-dimensional, Dilated, and GLUs. The GLUs use the output hi of the convolutional layer represented by the above Expression (2).

<Action of the Acoustic Signal Analysis Device According to the Embodiment of the Present Invention>

Action of the acoustic signal analysis device 200 according to the embodiment of the present invention is explained. The acoustic signal analysis device 200 executes an acoustic signal analysis processing routine illustrated in FIG. 4.

Figure 4:
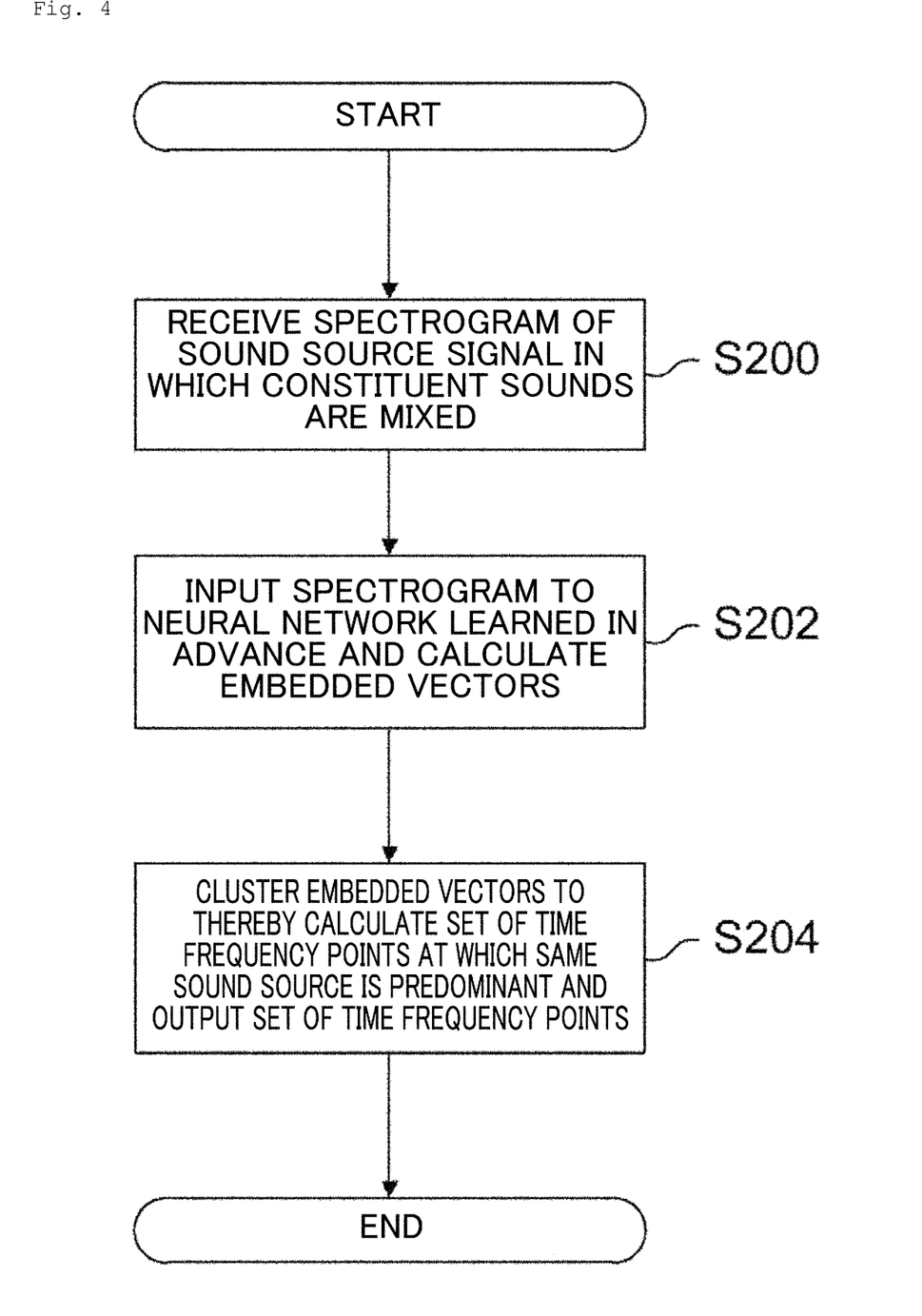
FIG. 4 is a flowchart illustrating an acoustic signal analysis processing routine in the acoustic signal analysis device according to the embodiment of the present invention.

First, in step S200, the acoustic signal analysis device 200 receives, as an input, a spectrogram of a sound source signal in which constituent sounds are mixed.

Subsequently, in step S202, the acoustic signal analysis device 200 inputs the spectrogram of the sound source signal received in step S200 to a neural network, which is a CNN, learned in advance by the acoustic signal model learning device 100 and calculates embedded vectors for each of the time frequency points.

Subsequently, in step S204, the acoustic signal analysis device 200 clusters the embedded vectors found in step S202 above for each of the time frequency points to thereby calculate a set of time frequency points at which the same sound source is dominant and outputs the set of the time frequency points to the output unit 250.

using a BLSTM and a case of using a CNN were compared. Learning data (for 30 hours), verification data (for 10 hours), and test data (for 5 hours) were created using a voice signal of a Wall Street Journal (WSJ0) Corpus. The learning data and the verification data were prevented from including voice of the same speaker. In order to confirm whether the proposed method operates without causing overlearning even with a small amount of learning data, small-size learning data (for 5.5 hours) and verification data (for 0.5 hours) were also created. Voice signals were down-sampled to 8 kHz. Data vectors $x_1, \ldots,$ and $x_J$ were obtained by dividing, for each T=128 frames, a logarithmical amplitude spectrogram (a frequency bin number is F=128) obtained by an STFT having a frame length of 254 points and a frame interval of 127 points. A dimension D of embedded vectors was set to 20. Parameter learning of an NN was performed using an Adam optimizer. A minibatch size was set to 8 or 16. Specific architectures of a CNN adopted as the proposed method in this experiment are illustrated in Table 1. A GLU was used as an activation function in all convolutional layers in all the architectures.

TABLE 1

| $l$ | 2D, B, w/o skip | 2D, B, w/skip | 2D, DC | 1D | 1D, DC |
|---|---|---|---|---|---|
| 1 | 5 × 5, 64, 1, 1, BN | 5 × 5, 64, 1, 1, BN | 3 × 3, 64, 1, 1, BN | 1 × 11, 512, 1, 1, BN | 1 × 3, 512, 1, 1, BN |
| 2 | 4 × 4, 64, ↓2, 1, — | 4 × 4, 64, ↓2, 1, — | 3 × 3, 64, 1, 2, BN | 1 × 11, 1024, 1, 1, BN | 1 × 3, 1024, 1, 2, BN |
| 3 | 3 × 3, 64, 1, 1, BN | 3 × 3, 64, 1, 1, BN | 3 × 3, 64, 1, 3, BN | 1 × 11, 2048, 1, 1, BN | 1 × 3, 2048, 1, 3, BN |
| 4 | 4 × 4, 64, ↓2, 1, — | 4 × 4, 64, ↓2, 1, — | 3 × 3, 64, 1, 4, BN | 1 × 11, 2048, 1, 1, BN | 1 × 3, 4096, 1, 4, BN |
| 5 | 3 × 3, 64, 1, 1, BN | 3 × 3, 64, 1, 1, BN | 3 × 3, D, 1, 5, BN | 1 × 11, FD, 1, 1, BN | 1 × 3, 4096, 1, 4, BN |
| 6 | 4 × 4, 64, ↑2, 1, BN | 4 × 4, D, ↑2, 1, BN | | | 1 × 3, 2048, 1, 4, BN |
| 7 | 4 × 4, D, ↑2, 1, BN | 4 × 4, D, ↑2, 1, BN | | | 1 × 3, FD, 1, 4, BN |

As explained above, with the acoustic signal analysis device according to the embodiment of the present invention, a spectrogram of a sound source signal received by the input unit 210 is input to a neural network, which is a CNN and receives, as an input, a spectrogram of a sound source signal learned in advance and outputs embedded vectors for each of time frequency points, the embedded vectors for each of the time frequency points are calculated, and the embedded vectors for each of the time frequency points are clustered, whereby the set of the time frequency points at which the same sound source is dominant is calculated. Consequently, it is possible to accurately calculate the set of the time frequency points at which the same sound source is dominant.

<Experiment Result>

In order to confirm effects in the method in the embodiment of the invention, sound separation performances in the case of a deep clustering method (this method) in a case of Signal-to-Distortion Ratio (SRD) improvement values by the conventional method and the proposed method are illustrated in Table 2. It was confirmed from these experiment results that a result surpassing a result obtained when a BLSTM was used was obtained when a two-dimensional/Dilated/gated CNN (GLU) was used for $g_\theta$.

TABLE 2

| | | Learning data amount | |
|---|---|---|---|
| | | 5.5 h | 30 h |
| Proposed method | 2D, B, w/o skip | 3.90 | 5.49 |
| | 2D, B, w/skip | 3.78 | 5.23 |
| | 2D, DC | 5.78 | 6.78 |
| | 1D | 3.49 | 5.16 |
| | 1D, DC | 3.94 | 6.36 |
| Conventional method | BLSTM (our implementation) | 1.57 | 2.46 |
| | BLSTM (result described in literature [1]) | — | 5.7 |

Note that, concerning the architecture of the CNN used in the experiment in Table 1, "2D" and "1D" represent a one-dimensional CNN and a two-dimensional CNN, "B" represents a bottleneck architecture, "DC" represented a Dilated CNN, "w/o skip" and "w/skip" represent presence or absence of a skip architecture, and "BN" represents batch normalization. Notations "$N^-_l$ to $M_l$, $D_l$, $\alpha$, $\beta$, and $\gamma$" in the table represent a filter size $\sim N^-_l \times M^-_l$ of layers, the number of output channels $D_l$, stride, dilation, and presence or absence of batch normalization. In a row of DC, if a number corresponding to beta is 2 or more, the number represents convolution of Dilated. When the number is 1, the number represents normal convolution. All elements of w are free parameters.

Note that the present invention is not limited to the embodiment explained above. Various modifications and applications are possible in a range not departing from the gist of the present invention.

REFERENCE SIGNS LIST

10 Input unit
20 Computing unit
30 Learning unit
50 Output unit
100 Acoustic signal model learning device
200 Acoustic signal analysis device
210 Input unit
220 Computing unit
230 Clustering unit
250 Output unit

The invention claimed is:

1. A computer-implemented method for processing sound data, the method comprising:
receiving predetermined spectrogram data of sound data for training, wherein the sound data comprises a plurality of sound sources, and wherein one sound source of the plurality of sound sources is dominant at a first set of time frequency points and at a second set of time frequency points;
generating, based on training, a convolutional neural network (CNN) using the received predetermined spectrogram data,
wherein the convolutional neural network includes parameters,
the convolutional neural network generates a plurality of embedded vectors as output based on the received predetermined spectrogram as input,
the plurality of embedded vectors includes a first set of embedded vectors corresponding to the first set of time frequency points and a second set of embedded vectors corresponding to the second set of time frequency points, and
the parameters are configured to generate the first set of embedded vectors corresponding to the first set of time frequency points to be within a predetermined threshold of deviation from the second set of embedded vectors corresponding to the second set of time frequency points at which the one sound source of the plurality of sound sources is dominant; and
providing the plurality of embedded vectors as output.

2. The computer-implemented method of claim 1, wherein the convolutional neural network includes one or more filters with coefficients and a plurality of convolutional layers, wherein the plurality of convolutional layers are configured as two-dimensional and using a gated linear unit, and wherein at least one coefficient of the coefficients has a value of zero for increasing a range of a receptive field without increasing parameters.

3. The computer-implemented method of claim 1, wherein the convolutional neural network includes one or more filters with coefficients and a plurality of convolutional layers, wherein the plurality of convolutional layers is configured as one-dimensional, and wherein the convolutional neural network is a Stride convolutional neural network allowing an application interval of convolution of the one or more filters to values other than one.

4. The computer-implemented method of claim 1, the method further comprising:
receiving spectrogram data of sound data, wherein the sound data includes a plurality of constituent sounds;
providing the received spectrogram data of sound data to the generated convolutional neural network;
receiving a third set of embedded vectors associated with a third set of time frequency points based on the received spectrogram data;
classifying the third set of embedded vectors into a plurality of clusters based on one or more time frequency points in the third set of the time frequency points;
identifying a fourth set of time frequency points based on the one or more time frequency points of the first set of time frequency points at which one sound source of the plurality of sound sources is dominant; and
providing the fourth set of time frequency points, wherein the fourth set of time frequency points indicate the one sound source of the plurality of sound sources being dominant in the received spectrogram data.

5. The computer-implemented method of claim 4, wherein the classifying the third set of embedded vectors is based on a deep clustering, and the method further comprising:
generating, at a time frequency point, a pair of the received spectrogram data and the predetermined spectrogram data;
determining a first dominant sound source for the received spectrogram data;
determining a second dominant sound source for the predetermined spectrogram data; and
generate time frequency masks for the time frequency point based on whether the first dominant sound source and the second sound source are identical.

6. The computer-implemented method of claim 4, wherein the generated neural network relates to an acoustic signal processing model, wherein the acoustic signal processing model receives a spectrogram of a sound source data as an input, and wherein the acoustic processing model provides a set of convolutional vectors for each of time frequency points as an output.

7. The computer-implemented method of claim 4, wherein the third set of time frequency points includes one or more time frequency points in the first set of time frequency points.

8. A system for processing sound data, the system comprises:
a processor; and
a memory storing computer-executable instructions that when executed by the processor cause the system to:
receive predetermined spectrogram data of sound data for training, wherein the sound data comprises a plurality of sound sources, and wherein one sound source of the plurality of sound sources is dominant at a first set of time frequency points and at a second set of time frequency points;
generate, based on training, a convolutional neural network (CNN) using the received predetermined spectrogram data,
wherein the convolutional neural network includes parameters,
the convolutional neural network generates a plurality of embedded vectors as output based on the received predetermined spectrogram as input,
the plurality of embedded vectors includes a first set of embedded vectors corresponding to the first set of time frequency points and a second set of embedded vectors corresponding to the second set of time frequency points, and the parameters are configured to generate the first set of embedded vectors corresponding to the first set of time frequency points to be within a predetermined threshold of deviation from the second set of embedded vectors corresponding to the second set of time frequency points at which the one sound source of the plurality of sound sources is dominant; and provide the plurality of embedded vectors as output.

9. The system of claim 8, wherein the convolutional neural network includes one or more filters with coefficients and a plurality of convolutional layers, wherein the plurality of convolutional layers are configured as two-dimensional and using a gated linear unit, and wherein at least one coefficient of the coefficients has a value of zero for increasing a range of a receptive field without increasing parameters.

10. The system of claim 8, wherein the convolutional neural network includes one or more filters with coefficients and a plurality of convolutional layers, wherein the plurality of convolutional layers are configured as one-dimensional, and wherein the convolutional neural network is a Stride convolutional neural network allowing an application interval of convolution of the one or more filters to values other than one.

11. The system of claim 8, the computer-executable instructions when executed further causing the system to:
receive spectrogram data of sound data, wherein the sound data includes a plurality of constituent sounds;
provide the received spectrogram data of sound data to the generated convolutional neural network;
receive a third set of embedded vectors associated with a third set of time frequency points based on the received spectrogram data;
classify the third set of embedded vectors into a plurality of clusters based on one or more time frequency points in the third set of the time frequency points;
identify a fourth set of time frequency points based on the one or more time frequency points of the first set of time frequency points at which one sound source of the plurality of sound sources is dominant; and
provide the fourth set of time frequency points, wherein the fourth set of time frequency points indicate the one sound source of the plurality of sound sources being dominant in the received spectrogram data.

12. The system of claim 11, wherein the classifying the plurality of embedded vectors is based on a deep clustering, and the computer-executable instructions when executed further causing the system to:
generate, at a time frequency point, a pair of the received spectrogram data and the predetermined spectrogram data;
determine a first dominant sound source for the received spectrogram data;
determine a second dominant sound source for the predetermined spectrogram data; and
generate time frequency masks for the time frequency point based on whether the first dominant sound source and the second sound source are identical.

13. The system of claim 11, wherein the generated neural network relates to an acoustic signal processing model, wherein the acoustic signal processing model receives a spectrogram of a sound source data as an input, and wherein the acoustic processing model provides a set of convolutional vectors for each of time frequency points as an output.

14. The system of claim 11, wherein the third set of time frequency points includes one or more time frequency points in the first set of time frequency points.

15. A computer-readable non-transitory recording medium storing computer-executable instructions that when executed by a processor cause a computer system to:
receive predetermined spectrogram data of sound data for training, wherein the sound data comprises a plurality of sound sources, and wherein one sound source of the plurality of sound sources is dominant at a first set of time frequency points and at a second set of time frequency points;
generate, based on training, a convolutional neural network (CNN) using the received predetermined spectrogram data,
wherein the convolutional neural network includes parameters,
the convolutional neural network generates a plurality of embedded vectors as output based on the received predetermined spectrogram as input,
the plurality of embedded vectors includes a first set of embedded vectors corresponding to the first set of time frequency points and a second set of embedded vectors corresponding to the second set of time frequency points, and
the parameters are configured to generate the first set of embedded vectors corresponding to the first set of time frequency points to be within a predetermined threshold of deviation from the second set of embedded vectors corresponding to the second set of time frequency points at which the one sound source of the plurality of sound sources is dominant; and
provide the plurality of embedded vectors as output.

16. The computer-readable non-transitory recording medium of claim 15, wherein the convolutional neural network includes one or more filters with coefficients and a plurality of convolutional layers, wherein the plurality of convolutional layers are configured as two-dimensional and using a gated linear unit, and wherein at least one coefficient of the coefficients has a value of zero for increasing a range of a receptive field without increasing parameters.

17. The computer-readable non-transitory recording medium of claim 15, wherein the convolutional neural network includes one or more filters with coefficients and a plurality of convolutional layers, wherein the plurality of convolutional layers are configured as one-dimensional, and wherein the convolutional neural network is a Stride convolutional neural network allowing an application interval of convolution of the one or more filters to values other than one.

18. The computer-readable non-transitory recording medium of claim 15, the computer-executable instructions when executed further causing the system to:
receive spectrogram data of sound data, wherein the sound data includes a plurality of constituent sounds;
provide the received spectrogram data of sound data to the generated convolutional neural network;
receive a third set of embedded vectors associated with a third set of time frequency points based on the received spectrogram data;
classify the third set of embedded vectors into a plurality of clusters based on one or more time frequency points in the third set of the time frequency points;
identify a fourth set of time frequency points based on the one or more time frequency points of the first set of time frequency points at which one sound source of the plurality of sound sources is dominant; and provide the fourth set of time frequency points, wherein the fourth set of time frequency points indicate the one sound source of the plurality of sound sources being dominant in the received spectrogram data.

19. The computer-readable non-transitory recording medium of claim 18, wherein the classifying the plurality of embedded vectors is based on a deep clustering, and the computer-executable instructions when executed further causing the system to:

generate, at a time frequency point, a pair of the received spectrogram data and the predetermined spectrogram data;

determine a first dominant sound source for the received spectrogram data;

determine a second dominant sound source for the predetermined spectrogram data; and generate time frequency masks for the time frequency point based on whether the first dominant sound source and the second sound source are identical.

20. The computer-readable non-transitory recording medium of claim 18, wherein the generated neural network relates to an acoustic signal processing model, wherein the acoustic signal processing model receives a spectrogram of a sound source data as an input, and wherein the acoustic processing model provides a set of convolutional vectors for each of time frequency points as an output.

* * * * *